United States Patent
Patel et al.

(10) Patent No.: US 12,026,684 B2
(45) Date of Patent: Jul. 2, 2024

(54) DIGITAL AND PHYSICAL ASSET TRANSFERS BASED ON AUTHENTICATION

(71) Applicant: Bank of America Corporation, Charlotte, NC (US)

(72) Inventors: Vinesh Premji Patel, London (GB); Michael R. Young, Davidson, NC (US); Manu J. Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 181 days.

(21) Appl. No.: 17/739,026

(22) Filed: May 6, 2022

(65) Prior Publication Data
US 2023/0360006 A1   Nov. 9, 2023

(51) Int. Cl.
G06Q 20/06        (2012.01)
G06F 3/04815      (2022.01)
G06Q 20/36        (2012.01)
G06T 13/40        (2011.01)

(52) U.S. Cl.
CPC ....... *G06Q 20/065* (2013.01); *G06F 3/04815* (2013.01); *G06Q 20/3674* (2013.01); *G06Q 20/3678* (2013.01); *G06T 13/40* (2013.01); *G06Q 2220/00* (2013.01)

(58) Field of Classification Search
CPC ............. G06Q 20/065; G06Q 20/3674; G06Q 20/102; G06F 3/04815; G06F 21/602; G06F 3/011; G16H 40/20
USPC ... 705/3, 7.26, 7.39, 14.49, 26.5, 39, 40, 51, 705/65, 66, 67; 713/159; 345/474, 582, 345/631; 726/4; 718/1
See application file for complete search history.

(56) References Cited

U.S. PATENT DOCUMENTS

| | | | |
|---|---|---|---|
| 8,564,621 B2 * | 10/2013 | Branson | G06T 19/006 345/631 |
| 9,794,797 B2 | 10/2017 | Hoffberg | |
| 10,022,613 B2 | 7/2018 | Tran et al. | |
| 10,505,726 B1 | 12/2019 | Andon et al. | |
| 10,540,640 B1 | 1/2020 | James et al. | |
| 10,540,653 B1 | 1/2020 | James et al. | |
| 10,540,654 B1 | 1/2020 | James et al. | |
| 10,649,429 B2 | 5/2020 | Orsini | |
| 10,789,590 B2 | 9/2020 | Tran et al. | |
| 10,832,522 B2 | 11/2020 | Simons | |
| 10,839,379 B2 | 11/2020 | Pierce et al. | |

(Continued)

*Primary Examiner* — Hani M Kazimi
*Assistant Examiner* — Sanjeev Malhotra (57) ABSTRACT

An apparatus for transferring virtual resources comprises a processor associated with a server. The processor is configured to conduct an interaction between a first user and an entity to transfer a physical object and a non-fungible token (NFT) to the first user, wherein the NFT is associated with the physical object. The processor is further configured to receive the NFT for storage in a first digital folder and to receive a request to establish an interaction session between a first avatar in a virtual environment and a second avatar associated with a second user. The processor is further configured to authorize the interaction session in response to authenticating the NFT and to conduct the interaction. The interaction includes initiating a transfer of the physical object from the first user to the second user and transmitting the NFT to a second digital folder associated with the second user.

20 Claims, 4 Drawing Sheets

(56) References Cited

U.S. PATENT DOCUMENTS

| | | | |
|---|---|---|---|
| 10,887,100 B2 | 1/2021 | Wentz | |
| 11,017,391 B1 | 5/2021 | Winklevoss et al. | |
| 11,139,081 B2 | 10/2021 | Tran et al. | |
| 11,188,977 B2 | 11/2021 | Youb et al. | |
| 11,651,842 B2* | 5/2023 | Jung | G06Q 50/22 705/3 |
| 2008/0052242 A1* | 2/2008 | Merritt | G06F 21/10 705/51 |
| 2009/0109229 A1* | 4/2009 | Hamilton, II | G06T 15/00 345/474 |
| 2009/0113421 A1* | 4/2009 | Hamilton, II | G06Q 10/10 718/1 |
| 2010/0174617 A1* | 7/2010 | Cannon | G06F 3/011 705/40 |
| 2011/0254853 A1* | 10/2011 | Hamilton, II | A63F 13/52 345/582 |
| 2013/0290137 A1* | 10/2013 | Olomskiy | G06Q 30/06 705/26.5 |
| 2013/0297413 A1* | 11/2013 | Pattan | G06Q 30/02 705/14.49 |
| 2015/0200950 A1* | 7/2015 | Meunier | G06Q 20/40 726/4 |
| 2016/0189077 A1* | 6/2016 | Azmoon | G06Q 10/109 705/7.26 |
| 2019/0058581 A1 | 2/2019 | Wood et al. | |
| 2019/0102946 A1* | 4/2019 | Spivack | G06T 19/003 |
| 2019/0107991 A1* | 4/2019 | Spivack | G09G 5/14 |
| 2019/0188450 A1* | 6/2019 | Spivack | G06V 40/103 |
| 2019/0188701 A1 | 6/2019 | Parsons et al. | |
| 2019/0236559 A1 | 8/2019 | Padmanabhan | |
| 2019/0236562 A1 | 8/2019 | Padmanabhan | |
| 2019/0236606 A1 | 8/2019 | Padmanabhan et al. | |
| 2019/0238316 A1 | 8/2019 | Padmanabhan | |
| 2019/0361917 A1 | 11/2019 | Tran et al. | |
| 2020/0005284 A1 | 1/2020 | Vijayan | |
| 2020/0042989 A1 | 2/2020 | Ramadoss et al. | |
| 2020/0169546 A1 | 5/2020 | Padmanabhan | |
| 2020/0294135 A1 | 9/2020 | Cella | |
| 2021/0158942 A1* | 5/2021 | Richards | G16H 10/60 |
| 2021/0256070 A1 | 8/2021 | Tran et al. | |
| 2021/0329121 A1* | 10/2021 | Spivack | G06T 19/003 |
| 2022/0036447 A1* | 2/2022 | Spivack | G06Q 40/04 |
| 2022/0040557 A1 | 2/2022 | Tran | |
| 2022/0398340 A1* | 12/2022 | Jakobsson | G06F 21/602 |
| 2022/0407702 A1* | 12/2022 | Jakobsson | H04L 9/3231 |
| 2023/0009304 A1* | 1/2023 | Jakobsson | G06Q 30/0241 |
| 2023/0055618 A1* | 2/2023 | Jakobsson | H04L 9/50 |
| 2023/0075884 A1* | 3/2023 | Jakobsson | H04L 9/50 |
| 2023/0086191 A1* | 3/2023 | Jakobsson | H04L 9/3231 705/66 |
| 2023/0086644 A1* | 3/2023 | Jakobsson | G06Q 20/367 705/65 |
| 2023/0114684 A1* | 4/2023 | Jakobsson | H04L 9/3213 713/159 |
| 2023/0120534 A1* | 4/2023 | Jakobsson | G06Q 20/223 705/39 |
| 2023/0196353 A1* | 6/2023 | Jakobsson | G06Q 20/401 705/39 |
| 2023/0230066 A1* | 7/2023 | Jakobsson | G06Q 20/3829 705/67 |
| 2023/0306350 A1* | 9/2023 | Hadi | G06N 3/084 |
| 2023/0325805 A1* | 10/2023 | Van Os | G06Q 20/223 |

\* cited by examiner

FIG. 4

DIGITAL AND PHYSICAL ASSET TRANSFERS BASED ON AUTHENTICATION

TECHNICAL FIELD

The present disclosure relates generally to network communications and information security. More particularly, in certain embodiments, the present disclosure is related to a system and method for transferring digital assets based on authentication.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. Data storing user devices, such as computers, laptops, augmented reality devices, virtual reality devices, and smartphones, are vulnerable to attacks. This vulnerability poses several network security challenges. Existing systems are typically unable to detect a malicious attack until after the attack has occurred. For example, a bad actor may pretend to have access to an authentic digital asset in a virtual environment and proceed to conduct a fraudulent interaction.

SUMMARY

The disclosed system provides several practical applications and technical advantages that overcome the previously discussed technical problems. The following disclosure provides a practical application of a server that is configured as an information security device for a virtual environment. The disclosed information security device provides practical applications that improve the information security of the virtual environment by authenticating a virtual resource by analyzing a blockchain record. This process provides a technical advantage that increases information security because it inhibits a bad actor from attempting to transfer an inauthentic or fraudulent virtual resource as an associated avatar in a virtual environment. This process may be employed to authenticate and validate the virtual resource of a user before allowing the user to perform an interaction within a virtual environment.

In an embodiment, an apparatus for transferring virtual resources comprises a memory and a processor. The memory is operable to store a non-fungible token (NFT) in a first digital folder associated with a first user and to store a blockchain record comprising a plurality of transfers for a blockchain. The processor is operably coupled to the memory and configured to conduct an interaction in a real-world between a first user device associated with the first user and an entity device associated with an entity to transfer a physical object and the NFT to the first user, wherein the NFT is associated with the physical object. The processor is further configured to receive the NFT during the interaction for storage in the first digital folder of the first user, wherein the NFT comprises data associated with the physical object and to receive a request from a second user device associated with a second user to establish an interaction session between a first avatar associated with the first user in a virtual environment and a second avatar associated with a second user in the virtual environment. The processor is further configured to authorize the interaction session between the first avatar and the second avatar in response to authenticating the NFT and to conduct an interaction between the first avatar and the second avatar. The interaction includes initiating a transfer of the physical object from the first user to the second user and transmitting the NFT to a second digital folder associated with the second user.

In another embodiment, an apparatus for transferring virtual resources comprises a memory and a processor. The memory is operable to store a non-fungible token (NFT) in a first digital folder associated with a first user and to store a blockchain record comprising a plurality of transfers for a blockchain. The processor is operably coupled to the memory and configured to receive a request from a second user device associated with a second user to establish an interaction session between a first avatar associated with the first user in a virtual environment and a second avatar associated with the second user in the virtual environment. The processor is further configured to authenticate the NFT based on data stored in the NFT, wherein the data stored in the NFT is associated with a physical object and to authorize the interaction session between the first avatar and the second avatar in response to authenticating the NFT. The processor is further configured to conduct an interaction between the first avatar and the second avatar to transfer the NFT to a second digital folder associated with the second user.

The disclosed system may further be integrated into an additional practical application of improving underlying operations of computing systems tasked to initiate and conduct interaction sessions with one or more users. For example, the disclosed system may reduce processing, memory, and time resources of a user device for identifying and validating a given virtual resource for each potential interaction. A separate server may analyze a blockchain record to authenticate the virtual resource and then may authorize an interaction session based on the authentication.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
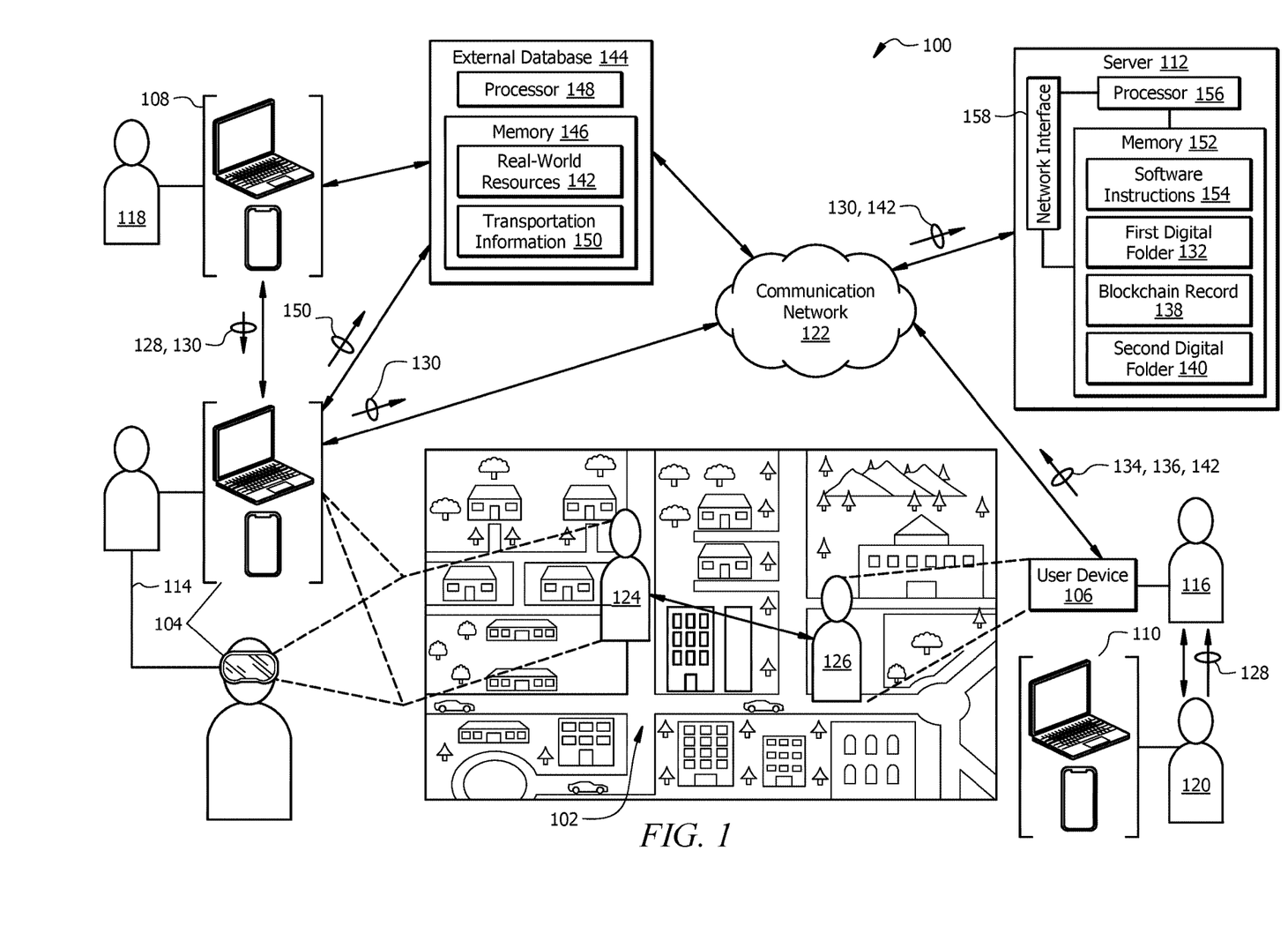
FIG. 1 is a schematic diagram of an example system for authentication of digital assets.
Figure 2:
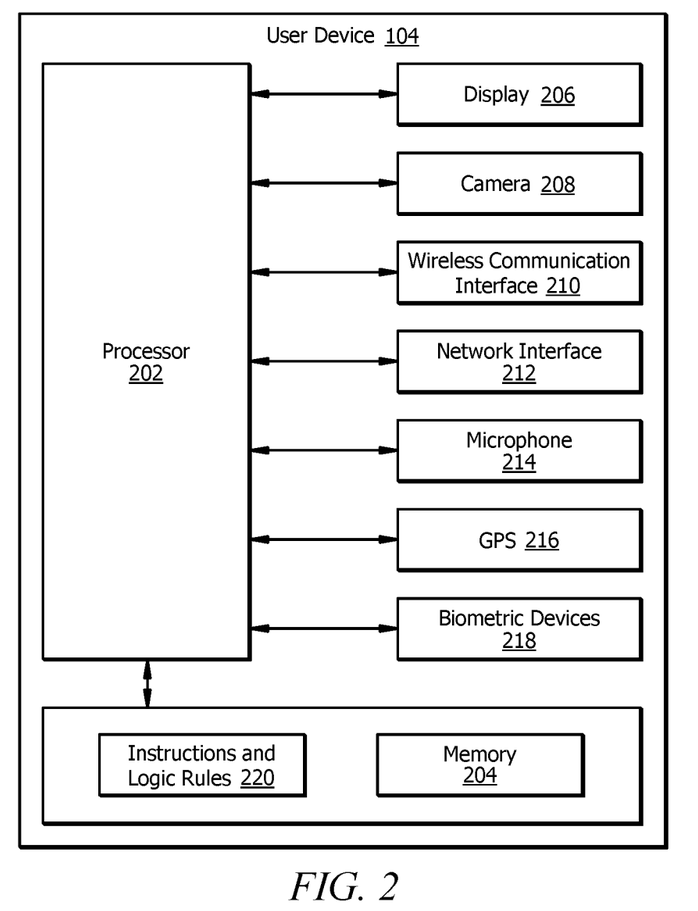
FIG. 2 is a block diagram of an example user device of the system of FIG. 1.
Figure 3:
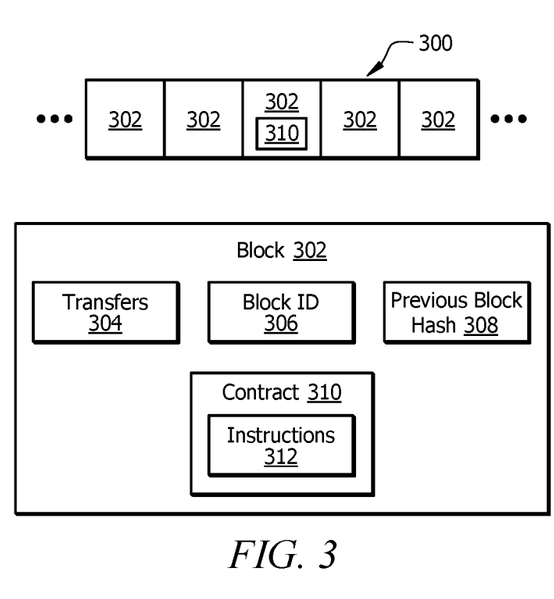
FIG. 3 is an embodiment of a blockchain of FIG. 1.
Figure 4:
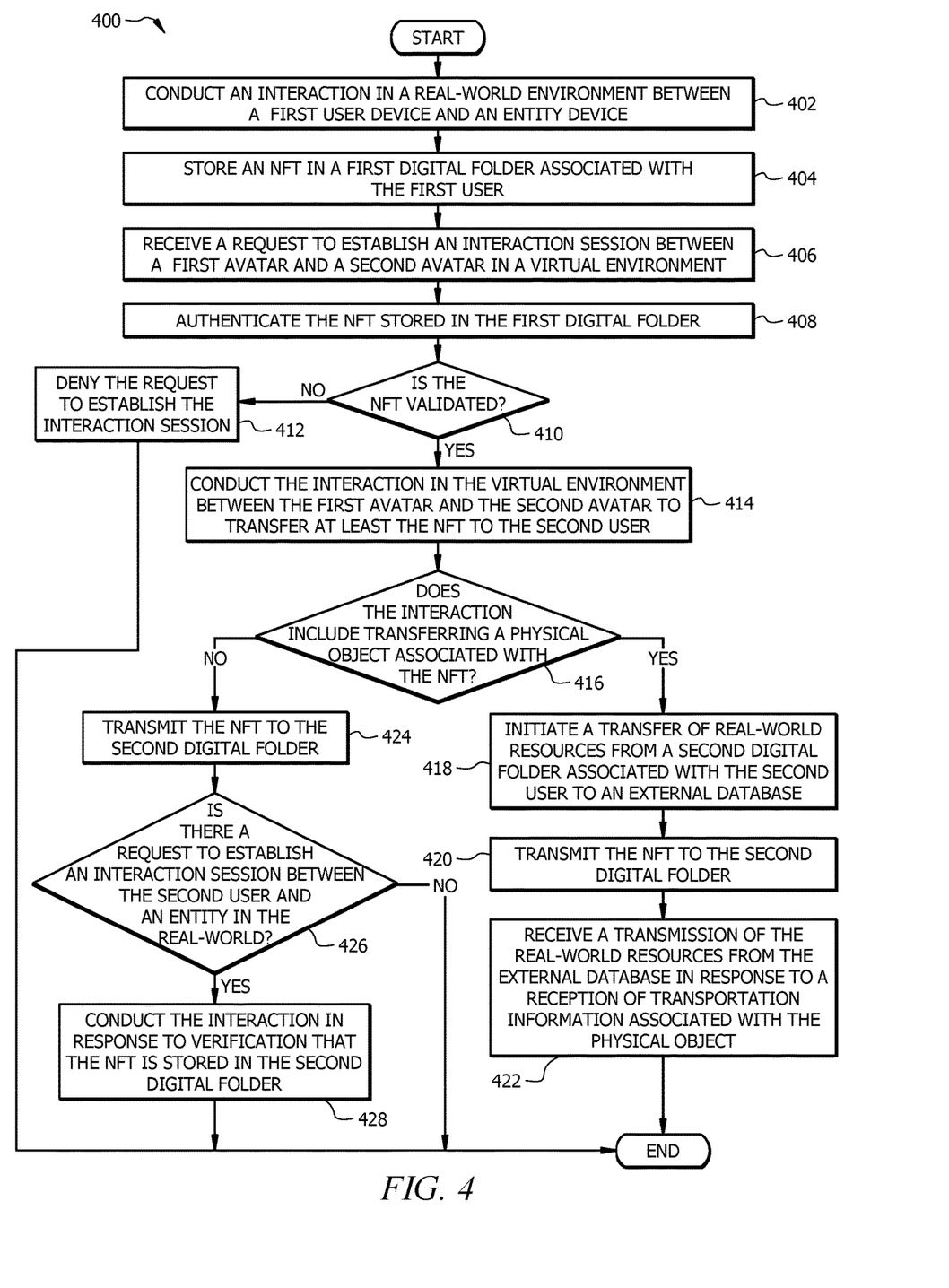
FIG. 4 is a flow diagram illustrating an example operation of the system of FIG. 1.

This disclosure provides solutions to the aforementioned and other problems of previous technology by authenticating digital assets for an interaction in a virtual environment. FIG. 1 is a schematic diagram of an example system for authentication of digital assets. FIG. 2 is a block diagram of an example user device of the system of FIG. 1. FIG. 3 is an embodiment of a blockchain record of FIG. 1. FIG. 4 is a flow diagram illustrating an example operation of the system of FIG. 1.

Example System for Authenticating Digital Assets

FIG. 1 illustrates a schematic diagram of an example system 100 that is generally configured to authenticate digital assets for an interaction in a virtual environment 102. The system 100 may include a first user device 104, a second user device 106, a first entity device 108, a second entity device 110, and a server 112. A first user 114 is associated with the first user device 104, a second user 116 is associated with the second user device 106, a first entity 118 is associated with the first entity device 108, and a second entity 120 is associated with the second entity device 110. The system 100 may be communicatively coupled to a communication network 122 and may be operable to transmit data between each one of the first user device 104, second user device 106, first entity device 108, second entity device 110, and the server 112 through the communication network 122. In general, the system 100 may improve electronic interaction technologies by authenticating a virtual resource prior to an interaction between the first user 114 and the second user 116 in the virtual environment 102. This process provides improved information security because it validates that a first avatar 124 that is associated with the first user 114 in the virtual environment 102 is not attempting to transfer a fraudulent virtual resource to a second avatar 126 that is associated with the second user 116 in the virtual environment 102.

For example, in a particular embodiment, a user (for example, the first user 114) may be located in proximity to an entity (for example, the first entity 118) in a real-world environment. The first user 114 may conduct an interaction with the first entity 118 to obtain a physical object 128. The physical object 128 may be any suitable structure or article of manufacture (for example, a watch, shoes, etc.). In embodiments, the physical object 128 may be associated with a virtual resource accessible in the virtual environment 102. Examples of virtual resources include, but are not limited to, virtual currency, non-fungible tokens (NFTs), virtual objects, virtual equipment, virtual vehicles, virtual property, images, documents, music files, video files, and text documents. For example, the first entity 118 may generate and/or maintain an NFT 130 associated with the physical object 128 to be transferred to the first user 114 during the interaction. The NFT 130 may comprise data associated with the physical object 128, including, but not limited to, a serial number of the physical object 128, proof of the interaction between the first entity 118 and the first user 114 (for example, a receipt), information of the physical appearance or attributes of the physical object 128, and information associated with manufacturing the physical object 128. By obtaining the physical object 128 during the interaction, the first user 114 may further receive the NFT 130 associated with the physical object 128. In embodiments, the first entity device 108 may transmit the NFT 130 to the first user device 104 during the interaction.

The first user device 104 may store the received NFT 130 in a first digital folder 132 associated with the first user 114. The first digital folder 132 may be accessible locally within the first user device 104 and/or via the server 112. After receiving the NFT 130, the first user device 104 may transmit the NFT 130 to the server 112 for storage in the first digital folder 132. As described above, the NFT 130 may be accessible in the virtual environment 102.

The first user 114 may access the virtual environment 102 through the first user device 104. The first user device 104 is configured to display a two-dimensional (2D) or three-dimensional (3D) representation of the virtual environment 102 to the first user 114. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity. Within the virtual environment 102, each user may be associated with an avatar (such as the first avatar 124 for the first user 114). An avatar is a graphical representation of the user at a virtual location within the virtual environment 102. In embodiments, the virtual location of the avatar may be correlated to a physical location of a user in the real-world environment. By using an avatar, a user is able to move within the virtual environment 102 to interact with another avatar and objects within the virtual environment 102 while independently remaining at the physical location or being in transit in the real-world environment.

Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. In embodiments, the features and characteristics of the avatar may be altered via the NFT 130. The first avatar 124 may access the NFT 130 stored in the first digital folder 132 and interact with the NFT 130 in the virtual environment 102. For example, the NFT 130 may comprise data associated with a certain watch as the physical object 128 from the interaction between the first user 114 and first entity 118. The NFT 130 may be configured to visually display a representation of the physical object 128 in the virtual environment. In this example, the NFT 130 may display a representation of the certain watch disposed on the first avatar 124.

While engaging in the virtual environment 102 via the first avatar 124, the first user 114 may interact with a plurality of other users through a respective avatar. For example, the second user 116 may attempt to engage in an interaction session with the first avatar 124 through a second avatar 126 associated with the second user 116 to obtain the NFT 130 and/or the physical object 128 associated with the NFT 130 in the real-world environment. In the real-world environment, the second user 116 may be located at a distance away from the first user 114. The second user 116 may access the virtual environment 102 through the second user device 106 to control the second avatar 126 and attempt to engage in an interaction session with the first user 114 through the first avatar 124. Because of the distance between the first user 114 and second user 116, the second user 116 may initiate a transfer of the physical object 128 by requesting a transfer of the associated NFT 130 in the virtual environment 102.

Before the interaction between the first avatar 124 and second avatar 126 occurs, the server 112 may authenticate the NFT 130. For example, any suitable user may be capable of generating a virtual resource, such as the NFT 130, but the generated virtual resource may not be authentic. If an interaction were to occur between the first avatar 124 and the second avatar 126 without prior authorization of the NFT 130, the second avatar 126 may receive a fraudulent or inauthentic NFT 130, wherein the fraudulent or inauthentic NFT 130 is not associated with the physical object 128. In embodiments, the NFT 130 may be authenticated by validating generation by the first entity 118.

In embodiments, the server 112 may receive a request 134 from the second user device 106 to establish an interaction session between the first avatar 124 and second avatar 126, wherein the interaction comprises transferring the NFT 130 to the second avatar 126 and initiating a transfer of the physical object 128 to the second user 116 in the real-world environment. The server 112 may further receive a request 136 from the second user device 106 to authenticate the NFT 130. To authenticate the NFT 130, the server 112 may access a blockchain record 138 that is configured to store a copy of a blockchain (such as blockchain 300 in FIG. 3). The blockchain is maintained across a distributed network comprising any suitable number of devices and comprises blocks (such as blocks 302 in FIG. 3) that contain every blockchain transfer executed in the network. Blockchain transfers may comprise information, files, or any other suitable type of data. For example, a transfer may comprise information associated with contracts, real-world resource transfers, virtual resource transfers, personal information, or any other type of information.

The server 112 may analyze one or more transfers stored in the blockchain associated with the NFT 130. The server 112 may perform a search query based on the hash information of the NFT 130 and/or based on first digital folder information (such as a location on the blockchain) to produce search results associated with the NFT 130. In embodiments, the interaction between the first user 114 and the first entity 118 to transfer the NFT 130 to the first user 114 may be stored in the blockchain. In one or more embodiments, the server 112 may have facilitated the interaction between the first user 114 and first entity 118 and updated the blockchain record 138 to include the interaction. In other embodiments, the server 112 may have received a signal from one or more devices communicatively coupled to the server 112 across the distributed network to update the blockchain record 138 to include the interaction. The server 112 may authorize the requested interaction session upon a determination of the interaction between the first user 114 and the first entity 118 stored in the blockchain.

The server 112 may further conduct the interaction between the first avatar 124 and second avatar 126 after authenticating the NFT 130. The interaction may comprise transferring the NFT 130 from the first digital folder 132 to a second digital folder 140 associated with the second user 116. Upon completion of the interaction, the second avatar 126 may access the NFT 130 stored in the second digital folder 140 and interact with or manipulate the NFT 130 in the virtual environment 102. For example, prior to the interaction, the first avatar 124 may be displayed in the virtual environment 102 as wearing a certain watch based on storage of the NFT 130 in the first digital folder 132, wherein the NFT 130 comprises data operable to display a representation of that certain watch. After the interaction, the second avatar 126 may be displayed in the virtual environment 102 as wearing the certain watch based on storage of the NFT 130 in the second digital folder 140.

In an example, the second user 116 may attempt to interact with the second entity 120 in the real-world environment. The second entity 120 may be associated with the first entity 118 (for example, same stores at different locations). The interaction may comprise transferring a physical object (for example, physical object 128) to the second user 116 based on verification that the NFT 130 is accessible by the second user 116. For example, the NFT 130 may be associated with a specific type or version of physical object in the real-world environment (such as limited edition shoes). The second entity 120 may be operable to transfer the physical object 128 with attributes of the specific type or version detailed by the NFT 130 (such as a pair of the limited edition shoes) in response to verification that the second user 116 is storing the NFT 130 in the second digital folder 140. The second user 116 may display the NFT 130, or verification that the NFT 130 is stored in the second digital folder 140, to the second entity 120 via the second user device 106. The server 112 may establish an interaction session between the second user device 106 and the second entity device 110 and conduct an interaction between the second user device 106 and the second entity device 110, wherein the interaction at least comprises transferring the physical object 128 to the second user 116.

In another example, the interaction between the first avatar 124 and second avatar 126 may further comprise initiating a transfer of the physical object 128 from the first user 114 to the second user 116. The server 112 may instruct the second user 114 to initiate a transfer of real-world resources 142 from the second digital folder 140 to an external database 144. The external database 144 may be operable to temporarily store data/information and to facilitate transfers between one or more users. The external database 144 may be accessible and communicatively coupled to the server 112 and one or more external, third-party servers. The external database 144 may be a suitable server (e.g., including a physical server and/or virtual server) operable to store data/information in a memory 146 and/or provide access to application(s) or other services. Memory 146 includes software instructions that, when executed by a processor 148, cause the external database 144 to perform one or more functions described herein. For example, the external database 144 may be a database operable to receive the real-world resources 142 from the second user device 106 and to receive transportation information 150 (for example, shipping information of the physical object 128) from the first user device 104. Once the external database 144 receives the transportation information 150, the processor 148 may transmit the stored real-world resources 142 to the server 112 for storage in the first digital folder 132. For example, the second user 116 may exchange the real-world resources 142 for the NFT 130 and physical object 128. The external database 144 may facilitate the exchange by verifying that the physical object 128 is being transported to the second user 116 after the interaction between the first avatar 124 and second avatar 126.

The server 112 is generally a suitable server (e.g., including a physical server and/or virtual server) operable to store data in a memory 152 and/or provide access to application(s) or other services. The server 112 may be a backend server associated with a particular group that facilitates conducting interactions between entities and one or more users. Details of the operations of the server 112 are described in conjunction with FIG. 4. Memory 152 includes software instructions 154 that, when executed by a processor 156, cause the server 112 to perform one or more functions described herein. Memory 152 may be volatile or non-volatile and may comprise a read-only memory (ROM), random-access memory (RAM), ternary content-addressable memory (TCAM), dynamic random-access memory (DRAM), and static random-access memory (SRAM). Memory 152 may be implemented using one or more disks, tape drives, solid-state drives, and/or the like. Memory 152 is operable to store software instructions 154, the first digital folder 132, second digital folder 140, blockchain record 138, and/or any other data or instructions. The software instructions 154 may comprise any suitable set of instructions, logic, rules, or code operable to execute the processor 156. In these examples, the processor 156 may be communicatively coupled to the memory 152 and may access the memory 152 for these determinations.

Processor 156 comprises one or more processors operably coupled to the memory 152. The processor 156 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 156 may be a programmable logic device, a microcontroller, a microprocessor, or any suitable combination of the preceding. The one or more processors are configured to process data and may be implemented in hardware or software. For example, the processor 156 may be 8-bit, 16-bit, 32-bit, 64-bit, or of any other suitable architecture. The processor 156 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 154. In this way, processor 156 may be a special-purpose computer designed to implement the functions disclosed herein. In an embodiment, the processor 156 is implemented using logic units, FPGAs, ASICs, DSPs, or any other suitable hardware. The processor 156 is configured to operate as described in FIGS. 1 and 4. For example, the processor 156 may be configured to perform the steps of method 400 as described in FIG. 4.

As illustrated, the server 112 may further comprise a network interface 158. Network interface 158 is configured to enable wired and/or wireless communications (e.g., via communication network 122). The network interface 158 is configured to communicate data between the server 112 and other devices (e.g., first user device 104, second user device 106, first entity device 108, second entity device 110, etc.), databases (e.g., external database 144), systems, or domain(s). For example, the network interface 158 may comprise a WIFI interface, a local area network (LAN) interface, a wide area network (WAN) interface, a modem, a switch, or a router. The processor 156 is configured to send and receive data using the network interface 158. The network interface 158 may be configured to use any suitable type of communication protocol as would be appreciated by one of skill in the art.

The communication network 122 may facilitate communication within the system 100. This disclosure contemplates the communication network 122 being any suitable network operable to facilitate communication between the first user device 104, second user device 106, first entity device 108, second entity device 110, and the server 112. Communication network 122 may include any interconnecting system capable of transmitting audio, video, signals, data, messages, or any combination of the preceding. Communication network 122 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a POT network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Each of the user devices (i.e., first user device 104 and second user device 106) may be any computing device configured to communicate with other devices, such as a server (e.g., server 112), databases, etc. through the communication network 122. Each of the user devices may be configured to perform specific functions described herein and interact with server 112, e.g., via its user interfaces. Each of the user devices is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user devices may comprise a graphical user interface (e.g., a display), a touchscreen, a touchpad, keys, buttons, a mouse, or any other suitable type of hardware that allows a user to view data and/or to provide inputs into the user device. Each user device may be configured to allow a user to send requests to the server 112 or to another user device.

Example User Device

FIG. 2 is a block diagram of an embodiment of the first user device 104 used by the system of FIG. 1. First user device 104 may be configured to display the virtual environment 102 (referring to FIG. 1) within a field of view of the first user 114 (referring to FIG. 1), capture biometric, sensory, and/or physical information of the first user 114 wearing the first user device 104, and to facilitate an electronic interaction between the first user 114 and the second user 116 (referring to FIG. 1). An example of the first user device 104 in operation is described in FIG. 4.

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the server 112 in FIG. 1).

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 4. For example, processor 202 may be configured to display virtual objects on display 206, detect hand gestures, identify virtual objects selected by a detected hand gesture (e.g., identify selected files), capture biometric information of a user, such as first user 114, via one or more of camera 208, microphone 214, and/or biometric devices 218, and communicate via wireless communication interface 210 with server 112 and/or second user device 106. In some embodiments, the function described herein is implemented using logic units, FPGAs, ASICs, DSPs, or any other suitable hardware or electronic circuitry.

The memory 204 is operable to store any of the information described with respect to FIGS. 1 and 4 along with any other data, instructions, logic, rules, or code operable to implement the function(s) described herein when executed by processor 202. For example, the memory 204 may store the instructions and logic rules 220, which are described below with respect to FIG. 4. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, first digital folder 132 (referring to FIG. 1), instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 114 in FIG. 1) in an augmented reality environment that overlays virtual or graphical objects onto tangible objects in a real scene in real-time. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display an augmented reality environment with virtual or graphical objects onto tangible objects in a real scene in real-time and/or virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 114. Camera 208 may be configured to capture images continuously, at predetermined intervals, or on-demand. For example, camera 208 may be configured to receive a command from first user 114 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as second user device 104 (referring to FIG. 1) or server 112 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 114. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 114, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Example Block of the Blockchain Record

FIG. 3 illustrates an embodiment of a blockchain 300 from the blockchain record 138 of FIG. 1. The blockchain 300 links together blocks 302 of data which comprise identifiable units called transfers 304. Transfers 304 may comprise information, files, or any other suitable type of data. For example, a transfer 304 may comprise information associated with contracts, real-world resource transfers, virtual resource transfers, personal information, or any other type of information.

Each block 302 in the blockchain 300 comprises a block identifier 306 and information derived from a preceding block 302. For example, every block 302 in the blockchain 300 includes a hash 308 of the previous block 302. By including the hash 308, the blockchain 300 comprises a chain of blocks 302 from a genesis block 302 to the current block 302. Each block 302 is guaranteed to come after the previous block 302 chronologically because the previous block's hash 308 would otherwise not be known. In one embodiment, blocks 302 in a blockchain 300 may be linked together by identifying a preceding block 302 with a cryptographic checksum (e.g., secure hash algorithm (SHA)-256) of its contents (e.g., the transfer and additional metadata) which serves as each block's unique identifier. Links are formed by storing the cryptographic checksum identifier of one block 302 in the metadata of another block 302, such that the former block 302 becomes the predecessor of the latter block 302. In this way, the blocks 302 form a chain that can be navigated from block-to-block by retrieving the cryptographic checksum of a particular block's predecessor from the particular block's own metadata. Each block 302 is computationally impractical to modify once it has been in the blockchain because every block 302 after it would also have to be regenerated. These features protect data stored in the blockchain 300 from being modified by bad actors which provides information security. When a network node creates an entry (e.g., one or more transfers 304 in a block 302) in its blockchain record 138, the blockchain 300 for all other network nodes in the distributed network is also updated with the new entry. Thus, data entered in a blockchain 300 is available and accessible to every network node with a copy of the blockchain record 138. This allows the data stored in the block 302 to be accessible for inspection and verification at any time by any device with a copy of the blockchain record 138.

Some blocks 302 comprise one or more contracts 310. The contracts 310 comprise machine-executable code, script, or instructions 312 that are configured to execute when a set of predetermined conditions have been satisfied. The contract 310 is configured to receive messages or information from other devices (e.g., first user device 104 or server 112) and to use the conditions as logical tests to determine whether or not to execute a set of instructions 312. The contract 310, instructions 312, and conditions may be written C++, C #, Go, Python, Java, extensible markup language (XML) script, or any other suitable programming language. The instructions 312 may be configured with instructions for performing any specified operations. For example, the instructions 312 may be configured to facilitate a real-world resource transfer and/or a virtual resource transfer between users. In one embodiment, the instructions 312 comprise instructions for entering a transfer in the blockchain 300 for transferring real-world resources and/or virtual resources between users' digital folders. In other embodiments, the instructions 312 may comprise any other suitable type and combination of machine-executable instructions for performing other types of operations. The conditions may be configured as Boolean tests for determining whether a condition has been satisfied. Examples of conditions include, but are not limited to, range threshold values, valid time periods, approved product and service types, approved locations or areas, or any other suitable type of condition.

In embodiments, the server 112 may initiate a transfer of virtual resources and/or the real-world resources between a first user and a second user. For example, the first user may provide a user input that indicates the first user approves or authorized the transfer between the first user and the second user. In this case, the server 112 may send instructions or commands to one or more contracts 310 in the blockchain record 138 to execute the one or more contracts 310 to perform a transfer of the virtual resources and/or the real-world resources between the first user and the second user.

Example Operation of the System for Authenticating Digital Assets

FIG. 4 is a flow diagram illustrating an example method 400 of the system 100 of FIG. 1. The method 400 may be implemented using the first user device 104, second user device 106, and the server 112 of FIG. 1. The method 400 may begin at step 402 where the server 112 may conduct an interaction between the first user device 104 and the first entity device 108 (referring to FIG. 1). For example, the first user 114 (referring to FIG. 1) may engage in an interaction session with the first entity 118 (referring to FIG. 1) in a real-world environment for the transfer of one or more physical objects 128 (referring to FIG. 1). During the interaction, the first user 114 may receive at least one physical object 128. The first user 114 may further receive the NFT 130 (referring to FIG. 1) associated with that at least one physical object 128 In an example, the NFT 130 may be a virtual resource generated by the first entity 118 and accessible in the virtual environment 102 (referring to FIG. 1). The NFT 130 may be associated with the physical object 128 in the real-world environment and may comprise data associated with the physical object 128.

At step 404, the received NFT 130 may be stored in the first digital folder 132 of the first user 114. The first digital folder 132 may be accessible locally via the first user device 104 and/or may be stored in the server 112. In embodiments, the processor 156 (referring to FIG. 1) of the server 112 may receive the NFT 130 from the first user device 104 for storage in the first digital folder 132. In embodiments, the features and characteristics of the first avatar 124 (referring to FIG. 1) in the virtual environment 102 may be altered via the NFT 130. The first avatar 124 may access the NFT 130 stored in the first digital folder 132 and interact with the NFT 130 in the virtual environment 102. For example, the NFT 130 may comprise data associated with the physical object 128 being a certain type of watch from the interaction between the first user 114 and first entity 118. The NFT 130 may be configured to visually display a representation of the physical object 128 in the virtual environment 102. In this example, the NFT 130 may display a representation of the certain type of watch disposed on the first avatar 124.

At step 406, the second user 116 (referring to FIG. 1) may request to receive the NFT 130 through an interaction with the first user 114 in the virtual environment 102. In embodiments, the second user device 106 may transmit the request 134 (referring to FIG. 1) to the server 112 to establish an interaction session between the first avatar 124 and second avatar 126 (referring to FIG. 1). Before the interaction between the first avatar 124 and second avatar 126 occurs, the server 112 may authenticate the NFT 130. For example, any suitable user may be capable of generating a virtual resource, such as the NFT 130, but the generated virtual resource may not be authentic. If an interaction were to occur between the first avatar 124 and the second avatar 126 without prior authorization of the NFT 130, the second avatar 126 may receive a fraudulent or inauthentic NFT 130, wherein the fraudulent or inauthentic NFT 130 is not associated with the physical object 128. In embodiments, the NFT 130 may be authenticated by validating generation thereof by the first entity 118.

At step 408, in response to the processor 156 of the server 112 receiving the request 136 (referring to FIG. 1) from the second user device 106 to authenticate the NFT 130, the processor 156 may access the memory 152 (referring to FIG. 1) to search the blockchain record 138 (referring to FIG. 1). The processor 156 of the server 112 may analyze one or more transfers 304 (referring to FIG. 3) stored in the blockchain 300 (referring to FIG. 3) associated with the NFT 130. The processor 156 of the server 112 may perform a search query based on the hash information of the NFT 130 and/or based on first digital folder information (such as a location on the blockchain 300) to produce search results associated with the NFT 130. In embodiments, the interaction between the first user 114 and the first entity 118 to transfer the NFT 130 to the first user 114 may be stored in the blockchain 300. The server 112 may have facilitated the interaction between the first user 114 and first entity 118 and updated the blockchain record 138 to include the interaction. In other embodiments, the server 112 may have received a signal from one or more devices communicatively coupled to the server 112 across the distributed network to update the blockchain record 138 to include the interaction. The processor 156 of the server 112 may authorize the requested interaction session upon a determination of the interaction between the first user 114 and the first entity 118 stored in the blockchain 300.

At step 410, the processor 156 may determine whether the NFT 130 has been validated for authentication. If the processor 156 determines that the NFT 130 is not authentic, the method 400 proceeds to step 412. Otherwise, the method 400 proceeds to step 414. At step 412, the processor 156 of the server 112 may deny the request to establish an interaction session between the first avatar 124 and the second avatar 126. Then, the method 400 proceeds to end.

At step 414, the processor 156 of the server 112 may establish the interaction session between the first avatar 124 and the second avatar 126 in order to conduct the interaction between the first user 114 and the second user 116. The processor 156 of the server 112 may then conduct the interaction, wherein the interaction comprises at least transferring the NFT 130 from the first digital folder 132 to the second digital folder 140 (referring to FIG. 1) associated with the second user 116.

At step 416, the processor 156 may determine whether the interaction included transferring the physical object 128 from the first user 114 to the second user 116 in the real-world environment. If the interaction does include transferring the physical object 128 from the first user 114 to the second user 116 in the real-world environment, the method 400 proceeds to step 418. Otherwise, the method 400 proceeds to step 424.

At step 418, the processor 156 may proceed to initiate a transfer of the physical object 128 from the first user 114 to the second user 116. The processor 156 of the server 112 may instruct the second user 114 to initiate a transfer of real-world resources 142 (referring to FIG. 1) from the second digital folder 140 to the external database 144 (referring to FIG. 1). The external database 144 may facilitate the exchange by verifying that the physical object 128 is being transported to the second user 116 after the interaction between the first avatar 124 and second avatar 126. The external database 144 may receive the real-world resources 142 from the second user device 106.

At step 420, the processor 156 may transmit the NFT 130 to the second digital folder 140 of the second user 116 for storage. The second digital folder 140 may be accessible locally via the second user device 106 and/or the server 112. Upon the second user 116 receiving the NFT 130, the second avatar 126 may access the NFT 130 stored in the second digital folder 140 and interact with or manipulate the NFT 130 in the virtual environment 102. For example, prior to the interaction, the first avatar 124 may be displayed in the virtual environment 102 as wearing the certain type of watch based on storage of the NFT 130 in the first digital folder 132, wherein the NFT 130 comprises data operable to display a representation of that watch. After the interaction, the second avatar 126 may be displayed in the virtual environment 102 as wearing the certain type of watch based on storage of the NFT 130 in the second digital folder 140.

At step 422, the external database 144 may receive transportation information 150 (referring to FIG. 1), such as shipping information of the physical object 128, from the first user device 104. Once the external database 144 receives the transportation information 150, the processor 156 may receive a transfer of the stored real-world resources 142 from the external database 144 for storage in the first digital folder 132. Upon receiving the real-world resources 142, the first user 114 may access the real-world resources 142 through the first digital folder 132. Then, the method 400 may proceed to end.

At step 424, in response to a determination that the interaction between the first avatar 124 and second avatar 126 does not include transferring the physical object 128 from the first user 114 to the second user 116 in the real-world environment, the processor 156 may transmit the NFT 130 to the second digital folder 140 of the second user 116 for storage. The second digital folder 140 may be accessible locally via the second user device 106 and/or the server 112. Upon the second user 116 receiving the NFT 130, the second avatar 126 may access the NFT 130 stored in the second digital folder 140 and interact with or manipulate the NFT 130 in the virtual environment 102. For example, prior to the interaction, the first avatar 124 may be displayed in the virtual environment 102 as wearing the certain type of watch based on storage of the NFT 130 in the first digital folder 132, wherein the NFT 130 comprises data operable to display a representation of that watch. After the interaction, the second avatar 126 may be displayed in the virtual environment 102 as wearing the certain type of watch based on storage of the NFT 130 in the second digital folder 140.

At step 426, the processor 156 may determine whether there is a request to establish an interaction session between the second user 116 and the second entity 120 in the real-world environment. In an example, the second user 116 may attempt to interact with the second entity 120 in the real-world environment, wherein the second entity 120 may be associated with the first entity 118 (for example, the same store at different locations). The interaction may comprise transferring a physical object (for example, physical object 128) to the second user 116 based on verification that the NFT 130 is accessible by the second user 116. For example, the NFT 130 may be associated with a specific type or version of physical object in the real-world environment (such as limited edition shoes). The second entity 120 may be operable to transfer the physical object 128 with attributes of the specific type or version detailed by the NFT 130 (such as a pair of the limited edition shoes) in response to verification that the second user 116 is storing the NFT 130 in the second digital folder 140. If there is a request to establish an interaction session between the second user 116 and the second entity 120, the method 400 proceeds to step 428. Otherwise, the method 400 proceeds to end.

At step 428, the second user 116 may display the NFT 130, or verification that the NFT 130 is stored in the second digital folder 140, to the second entity 120 via the second user device 106. The processor 156 of the server 112 may establish the interaction session between the second user device 106 and the second entity device 110 and conduct the interaction between the second user device 106 and the second entity device 110, wherein the interaction comprises transferring the physical object 128 to the second user 116. After conducting the interaction, the method 400 proceeds to end.

While several embodiments have been provided in the present disclosure, it should be understood that the disclosed systems and methods might be embodied in many other specific forms without departing from the spirit or scope of the present disclosure. The present examples are to be considered as illustrative and not limiting, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus for transferring virtual resources, comprising:
a memory operable to:
store a non-fungible token (NFT) in a first digital folder associated with a first user; and
store a blockchain record comprising a plurality of transfers for a blockchain; and
a processor, operably coupled to the memory, configured to:
conduct an interaction in a real-world between a first user device associated with the first user and an entity device associated with an entity to transfer a physical object and the NFT to the first user, wherein the NFT is associated with the physical object;
receive the NFT during the interaction for storage in the first digital folder of the first user, wherein the NFT comprises data associated with the physical object, the data comprising information of a physical appearance or attributes of the physical object and at least one of a serial number of the physical object or a proof of the interaction between the entity and the first user;
receive a request from a second user device associated with a second user to establish an interaction session between a first avatar associated with the first user in a virtual environment and a second avatar associated with a second user in the virtual environment;
authorize the interaction session between the first avatar and the second avatar in response to authenticating the NFT; and
conduct an interaction between the first avatar and the second avatar, the interaction comprising:
accessing data associated with the NFT comprising the physical appearance of the physical object, and visually displaying a representation of the physical object in the virtual environment;
receiving via the interaction session a request from the second user for a transfer of the NFT and the physical object to the second user;
initiating a transfer of the physical object from the first user to the second user; and
transmitting the NFT to a second digital folder associated with the second user.

2. The apparatus of claim 1, wherein the processor is further configured to:
receive a request from the second user device to authenticate the NFT; and
validate the NFT by accessing the blockchain record to verify the interaction between the first user device and the entity device.

3. The apparatus of claim 2, wherein the processor is further configured to:
analyze one or more transfers stored in the blockchain record associated with the NFT.

4. The apparatus of claim 1, wherein the memory is further configured to:
update the blockchain record to indicate that the received NFT is stored in the first digital folder of the first user in response to conducting the interaction between the first user device and the entity device.

5. The apparatus of claim 1, wherein the memory is further configured to:
update the blockchain record to indicate that the received NFT is stored in the second digital folder of the second user in response to conducting the interaction between the first avatar and the second avatar.

6. The apparatus of claim 1, wherein the data of the NFT further comprises information associated with manufacturing the physical object.

7. The apparatus of claim 1, wherein the processor is further configured to:
   initiate a transfer of real-world resources from the second digital folder to an external database; and
   receive the real-world resources from the external database for storage in the first digital folder in response to the external database receiving transportation information from the first user device associated with the physical object.

8. A method for transferring virtual resources, comprising:
   conducting an interaction in a real-world between a first user device associated with a first user and an entity device associated with an entity to transfer a physical object and a non-fungible token (NFT) to the first user, wherein the NFT is associated with the physical object;
   receiving the NFT during the interaction for storage in a first digital folder associated with first user, wherein the NFT comprises data associated with the physical object, the data comprising information of a physical appearance or attributes of the physical object and at least one of a serial number of the physical object or a proof of the interaction between the entity and the first user;
   receiving a request from a second user device associated with a second user to establish an interaction session between a first avatar associated with the first user in a virtual environment and a second avatar associated with a second user in the virtual environment;
   authorizing the interaction session between the first avatar and the second avatar in response to authenticating the NFT; and
   conducting an interaction between the first avatar and the second avatar, the interaction comprising:
      accessing data associated with the NFT comprising the physical appearance of the physical object, and visually displaying a representation of the physical object in the virtual environment;
      receiving via the interaction session a request from the second user for a transfer of the NFT and the physical object to the second user;
      initiating a transfer of the physical object from the first user to the second user; and
      transmitting the NFT to a second digital folder associated with the second user.

9. The method of claim 8, further comprising:
   receiving a request from the second user device to authenticate the NFT; and
   validating the NFT by accessing a blockchain record to verify the interaction between the first user device and the entity device.

10. The method of claim 9, further comprising analyzing one or more transfers stored in the blockchain record associated with the NFT.

11. The method of claim 8, further comprising updating a blockchain record to indicate that the received NFT is stored in the first digital folder of the first user in response to conducting the interaction between the first user device and the entity device.

12. The method of claim 8, further comprising updating a blockchain record to indicate that the received NFT is stored in the second digital folder of the second user in response to conducting the interaction between the first avatar and the second avatar.

13. The method of claim 8, wherein the data of the NFT further comprises information associated with manufacturing the physical object.

14. The method of claim 8, further comprising:
   initiating a transfer of real-world resources from the second digital folder to an external database; and
   receiving the real-world resources from the external database for storage in the first digital folder in response to the external database receiving transportation information from the first user device associated with the physical object.

15. A non-transitory computer-readable medium comprising instructions that are configured, when executed by a processor, to:
   conduct an interaction in a real-world between a first user device associated with a first user and an entity device associated with an entity to transfer a physical object and a non-fungible token (NFT) to the first user, wherein the NFT is associated with the physical object;
   receive the NFT during the interaction for storage in a first digital folder associated with the first user, wherein the NFT comprises data associated with the physical object, the data comprising information of a physical appearance or attributes of the physical object and at least one of a serial number of the physical object or a proof of the interaction between the entity and the first user;
   receive a request from a second user device associated with a second user to establish an interaction session between a first avatar associated with the first user in a virtual environment and a second avatar associated with a second user in the virtual environment;
   authorize the interaction session between the first avatar and the second avatar in response to authenticating the NFT; and
   conduct an interaction between the first avatar and the second avatar, the interaction comprising:
      accessing data associated with the NFT comprising the physical appearance of the physical object, and visually displaying a representation of the physical object in the virtual environment;
      receiving via the interaction session a request from the second user for a transfer of the NFT and the physical object to the second user;
      initiating a transfer of the physical object from the first user to the second user; and
      transmitting the NFT to a second digital folder associated with the second user.

16. The non-transitory computer-readable medium of claim 15, wherein the instructions are further configured to:
   receive a request from the second user device to authenticate the NFT; and
   validate the NFT by accessing a blockchain record to verify the interaction between the first user device and the entity device.

17. The non-transitory computer-readable medium of claim 16, wherein the instructions are further configured to:
   analyze one or more transfers stored in the blockchain record associated with the NFT.

18. The non-transitory computer-readable medium of claim 15, wherein the data of the NFT further comprises information associated with manufacturing the physical object.

19. The non-transitory computer-readable medium of claim 15, wherein the instructions are further configured to:
   initiate a transfer of real-world resources from the second digital folder to an external database; and receive the real-world resources from the external database for storage in the first digital folder in response to the external database receiving transportation information from the first user device associated with the physical object.

20. The non-transitory computer-readable medium of claim 15, wherein the instructions are further configured to:
instruct a memory to update a blockchain record to indicate that the received NFT is stored in the first digital folder of the first user in response to conducting the interaction between the first user device and the entity device; and
instruct the memory to update the blockchain record to indicate that the received NFT is stored in the second digital folder of the second user in response to conducting the interaction between the first avatar and the second avatar.

\* \* \* \* \*